US005084718A

United States Patent [19]

Yamazaki et al.

[11] Patent Number: 5,084,718

[45] Date of Patent: Jan. 28, 1992

[54] WET RECORDING APPARATUS AND WET RECORDING METHOD

[75] Inventors: Hideo Yamazaki; Yoshinori Miyazawa; Koichi Higashimura; Makoto Fujino, all of Nagano, Japan

[73] Assignee: Seiko Epson Corporation, Tokyo, Japan

[21] Appl. No.: 533,351

[22] Filed: Jun. 5, 1990

[30] Foreign Application Priority Data

| | | | |
|---|---|---|---|
| Jun. 5, 1989 | [JP] | Japan | 1-142464 |
| Jun. 8, 1989 | [JP] | Japan | 1-146487 |
| Jun. 29, 1989 | [JP] | Japan | 1-167384 |
| Oct. 26, 1989 | [JP] | Japan | 1-279147 |
| Nov. 24, 1989 | [JP] | Japan | 1-305513 |
| Nov. 29, 1989 | [JP] | Japan | 1-310275 |

[51] Int. Cl.[5] .................... G01D 15/06; G03G 15/01

[52] U.S. Cl. .................................. 346/157; 346/159

[58] Field of Search .......................... 346/159, 157; 355/256–258

[56] References Cited

U.S. PATENT DOCUMENTS 4,330,788 5/1982 Hinz et al. ........................ 346/157

*Primary Examiner*—George H. Miller, Jr.

*Attorney, Agent, or Firm*—Cushman, Darby & Cushman

[57] ABSTRACT

In a wet recording apparatus comprising: an image bearing structure; a developing solution prepared by dispersing charged color material particles in a dispersion medium; an ion generating unit; and ion current control units, the developing solution is applied to the image bearing structure to form a developing solution layer thereon, the ion current controlling unit operates to cause ions produced by the ion generating unit to stick selectively to the surface of the developing solution layer, to form a color material image on the image bearing structure, and the color material image is transferred, as a toner image, onto a recording sheet.

38 Claims, 9 Drawing Sheets

WET RECORDING APPARATUS AND WET RECORDING METHOD

BACKGROUND OF THE INVENTION

1. Field of the Invention

This invention relates to a wet recording method in which a developing solution is used to form an image, and a wet recording apparatus for practicing the method.

2. Prior Art

In a conventional wet recording apparatus a recording electrode is held on an insulating holder, and voltage is applied between the recording electrode and a confronting electrode (cf. U.S. Pat. No. 4,330,788). In the conventional apparatus, the confronting electrode is an image bearing structure which has a conductive surface and is movable, the developing solution containing pigment particles which are moved by electrophoresis is held between the recording electrode and the image bearing structure, and the electric field formed upon application of voltage to the recording electrode acts to form an image on the image bearing structure.

The developing solution is prepared by dispersing color material particles (generally pigment particles) in a liquid dispersion medium so that, upon formation of electric fields, the particles are moved by electrophoresis. The pigment particles are treated as follows: In order to control the charging and fixing characteristics of the pigment particles, a charge control agent and pigment cover agent are applied to the surfaces of the pigment particles by adsorption or adhesion.

The above-described conventional wet recording apparatus is disadvantageous in the following points:

In the apparatus, the electric field is formed only when voltage is applied to the recording electrode, and therefore formation of the image must be accomplished while an image forming portion of the image bearing structure passes through the recording electrode. In general, the electrophoretic speed of a developing solution is low, and therefore it is necessary to increase the voltage applied to the recording electrode, or to decrease the speed of movement of the image bearing structure. However, the increase of the voltage results in an increase in manufacturing cost, and the decrease in the speed of movement of the image bearing structure results in another difficulty that the time required for obtaining a desired image is increased. In addition, since the recording electrode is held in the developing solution, the end face of the recording electrode is soiled thereby, or the pigment particles stick to the recording electrode to deteriorate the latter.

Furthermore, in the conventional apparatus, the electric field formed by application of the voltage to the recording electrodes spreads in the same manner as the electric field formed between a charged point and plane does. Hence, the image formed on a recording medium becomes larger than the width of the recording electrode, and it becomes foggy. Moreover, in the case where an image is formed directly on a conductive recording medium, it is impossible to form the image on the ordinary sheet.

One example of the conventional wet recording apparatus is an electrophotographic recording apparatus. In the apparatus, the image bearing structure is a photoconductive drum, an electrostatic latent image on the photo-conductive drum is developed into a toner image by a developing unit, and brought into contact with a recording sheet, so that it is electrostatically transferred onto a recording sheet Electrophotographic Society Publication "Transition and Tendency of Wet Copying Machine", by Mochizuki et al, 26, 3 (1987) pp 270–276).

In the apparatus, the electrostatic latent image is converted into a toner image with high fidelity when passing through the developing unit; however, the transferred image is low in picture quality, being affected by the unevenness of the surface of the recording sheet. More specifically, if the recording sheet is low in smoothness, then the toner is transferred to the protrusions of the recording sheet, but not to the depressions, so that the toner image transferred onto the recording sheet is partially incomplete, being low in picture quality.

One example of a conventional recording apparatus for recording the same picture repeatedly is a copying machine which uses a belt-shaped photo-conductive material and dry toner. In the conventional copying machine, the belt-shaped photo-conductive material is wound on a drum one turn, and a charging operation, exposing operation, developing operation, and flash-fixing operation are carried out successively to form a block copy; and in recording an original image repeatedly, a charging operation, entire surface exposing operation, developing operation, transferring operation, and fixing operation are repeatedly carried out to form hard copies ("4th Non-impact Printing Technique Simposium Papers P113" by Yoshino, Masami).

The above-described copying machine is disadvantageous in the following points: Even when it is required to form only one image, it is necessary to wind the photo-conductive material on the drum, and the photoconductive material used must be removed from the drum for the next image forming operation. Since these operations are carried out automatically, the copying machine is unavoidably bulky. Use of the photo-conductive material results in an increase in running cost. Furthermore, the copying machine is intricate in construction and high in manufacturing cost, because its structure requires light-shielding means.

SUMMARY OF THE INVENTION

Accordingly, an object of this invention is to eliminate the above-described difficulties accompanying a conventional wet recording apparatus.

More specifically, an object of the invention is to provide a wet recording method in which low voltage control is made to form an image at high speed and at low cost, and an image is formed in a non-contact mode, and a wet recording apparatus for practicing the method.

Another object of the invention is to provide a wet recording apparatus which can form an image high in picture quality irrespective of the smoothness of a recording sheet.

A further object of the invention is to provide a wet recording apparatus simple in construction and small in size which can record an original image repeatedly without a photo-conductive material.

A first example of a wet recording apparatus according to the invention which comprises: a developing solution prepared by dispersing charged color material particles in a dispersion medium; ion generating means; ion current controlling means; developing solution applying means; and a recording sheet arranged near the ion current controlling means, the ion current controlling means controlling a current of ions generated by the ion generating means to cause the ions to stick selectively to the surface of the developing solution, to form a color material image on the recording sheet.

In the wet recording apparatus, the developing solution is applied to the surface of a recording sheet with a constant thickness by the developing solution applying means, and ions produced by the ion generating means are stuck selectively to the developing solution surface by the ion current controlling means. The sticking of the ions to the developing solution surface is controlled by the ion current controlling means; however, the ions are stuck to the developing solution surface at high speed because they move through an air gap. Under the electric field formed by the ions deposited on the developing solution surface, electrophoresis occurs with the charged pigment particles suspended in the developing solution, so that the charged pigment particles are moved towards the recording sheet, thus forming an image thereon. In this operation, the pigment particles are moved at relatively low speed towards the recording sheet against the viscous resistance of the dispersion medium. With the wet recording apparatus, it is unnecessary to accomplish the formation of an image simultaneously when the ions stick to the developing solution surface. In other words, in the apparatus of the invention, as the recording sheet and the developing solution move, the ions stuck thereto are also moved, and therefore the formation of an image can be accomplished during the movement of the ions. Hence, the formation of an image can be controlled according to the time required for the ions to stick to the developing solution; that is, with the apparatus, an image can be formed at high speed. In addition, the ion generating means and the ion current controlling means will not be deteriorated by the pigment particles, because they are not brought into contact with the developing solution.

Another example of the wet recording apparatus according to the invention comprises: a developing solution prepared by dispersing charged color material particles; ion generating means; and ion current controlling means which operates to cause ions opposite in polarity to the charged color material particles to stick selectively to the surface of a developing solution layer formed on a recording medium.

In the apparatus, electrophoresis occurs with the color material particles charged opposite in polarity to the ions, thus forming a color material image on the surface of the developing solution on the recording medium to which the ions are selectively stuck by the ion current controlling means. The color material particles are moved by electrophoresis to confront with the ions through the developing solution surface. Therefore, the color material image thus formed, corresponding to the pattern of the ions selectively stuck to the developing solution surface with high fidelity, is high in picture quality. In the apparatus, the image forming speed depends on the speed at which the ions stick to the developing solution surface instead of the electrophoric speed; that is, formation of an image is carried out at high speed.

In a wet recording method according to the invention, and in an apparatus for practicing the method, or another example of the wet recording apparatus of the invention, a developing solution prepared by dispersing charged color material particles in a dispersion medium, ion generating means, and ion current controlling means are provided, and the ion current controlling means operates to cause ions produced by the ion generating means to stick selectively to an image bearing structure to which the developing solution has been applied, to form a color material image on the image bearing structure, and the color material image is transferred, as a toner image, on a recording sheet.

In the method or apparatus, in an image transferring operation, the recording sheet can be abutted against the image bearing structure under high pressure. Therefore, the image can be satisfactorily transferred onto the recording sheet irrespective of the smoothness of the latter. Furthermore, since the image formation is carried out by ion current control, the image forming speed is considerably high.

Another example of the wet recording apparatus according to the invention comprises: a developing solution film bearing structure on which a developing solution prepared by dispersing charged color material particles is held in the form of a uniform developing solution film; ion current controlling means for causing ions to stick selectively on the surface of the developing solution film formed on the developing solution film bearing structure; and transferring means for moving a recording medium into or out of engagement with the surface of the developing solution film to which the ions have been selectively stuck.

In the apparatus, first a uniform developing solution is formed on the developing solution film bearing structure, and then the ion current controlling means is operated to stick ions selectively to the developing solution film surface. The ions thus stuck apply electrostatic force to the charged color material particles suspended in the developing solution film; that is, electrophoresis occurs with the charged color material particles. As a result, the charged color material particles are distributed in correspondence to the pattern of the ions stuck selectively to the developing solution film surface, thus forming their pattern on a part of the surface of the developing solution film. In the transferring section, the recording medium is moved into and out of engagement with the developing solution film surface, so that the part of the developing solution film surface on which the distribution pattern of charged color material particle distribution pattern has been formed, is transferred onto the recording medium. Thus, the aimed record has been formed.

In another example of the wet recording apparatus according to the invention, a toner image is formed on an image bearing structure by electrophoresis and is then transferred onto a recording sheet. The apparatus comprises: an elastic image bearing structure instead of the image bearing structure, the elastic image bearing structure having an elastic layer whose surface is flat and smooth; a transferring unit incorporating a heat source, and voltage applying means for applying voltage across the elastic image bearing structure and the transferring unit which are confronted with each other through a recording sheet, to transfer the toner image onto the recording sheet.

In the apparatus, a toner image is formed on the elastic image bearing structure, and is then pushed through a recording sheet against the transferring unit with the heat source so as to be transferred onto the recording sheet. Voltage is applied between the elastic image bearing structure and the transferring unit so as to form an image transferring electric field. Thus, the electrostatic force attributing to the electric field, the force of depression of the transferring unit, and the heat provided from behind the recording sheet are applied to the toner image, so that the latter is molten, transferred onto the recording sheet, and fixed thereon. In this operation, since the image bearing structure is elastic, the toner image can be transferred onto the recording sheet with high fidelity according to the unevenness of the latter; that is, the image transferring operation is carried out satisfactorily irrespective of the smoothness of the recording sheet.

In another example of the wet recording apparatus according the invention, a block copy is formed during one rotation of a conductive image bearing structure, and thereafter the block copy is utilized for an operation of forming the same image repeatedly. The apparatus comprises: liquid toner applying means for applying a liquid toner prepared by dispersing charged color material particles in a dispersion medium to the conductive image bearing structure; ion current controlling means for causing ions to stick selectively on the conductive image bearing structure to which the liquid toner has been applied by the liquid toner applying means, to form a primary color material image thereon; heating means for fixing the primary color material image which has been formed by the ion current controlling means; and charging means and developing means for applying ions uniformly to the conductive image bearing structure on which the color material image has been fixed by the heating means, to form a secondary color material image on the primary color material image. In the case where the operation of forming the same image repeatedly is not carried out, the operation of the heating means is suspended.

In the apparatus, the ion current controlling means operates to cause ions to deposit selectively on the liquid toner layer which is formed on the conductive image bearing structure by the liquid toner applying means, as a result of which electrophoresis occurs with the charged pigment particles suspended in the liquid toner layer, thus forming a toner image corresponding to the image pattern. When the toner image is heated with the heating means, the dispersion medium is evaporated, so that the image is fixed, thus providing the aimed block copy. Ions opposite in polarity to the toner are applied to the block copy thus formed. In this case, in the region where toner has stuck, the toner acts as insulator to accumulate electric charges, thus providing a surface potential; whereas in the region where no toner, has stuck, no electric charges are accumulated because the image bearing structure is electrically conductive. When, under this condition, the developing operation is carried out, the liquid toner sticks to the region by electrophoresis where the toner has stuck, thus forming a secondary toner image. The secondary toner image can be transferred and fixed by the ordinary methods. Hence, by repeatedly performing the ion applying operation, developing operation, transferring operation and fixing operation, the same image can be repeatedly formed by repeatedly perform; that is, a plurality of sheets bearing the same image can be obtained.

The nature, principle and utility of the invention will become more apparent from the following detailed description when read in conjunction with the accompanying drawings.

BRIEF DESCRIPTION OF THE DRAWINGS

In the accompanying drawings:

FIG. 4(*b*) is a perspective view showing ion current controlling means in the apparatus of FIG. 4(*a*);

DETAILED DESCRIPTION OF THE PREFERRED EMBODIMENTS

Preferred embodiments of this invention will be described with reference to the accompanying drawings.

Figure 1:
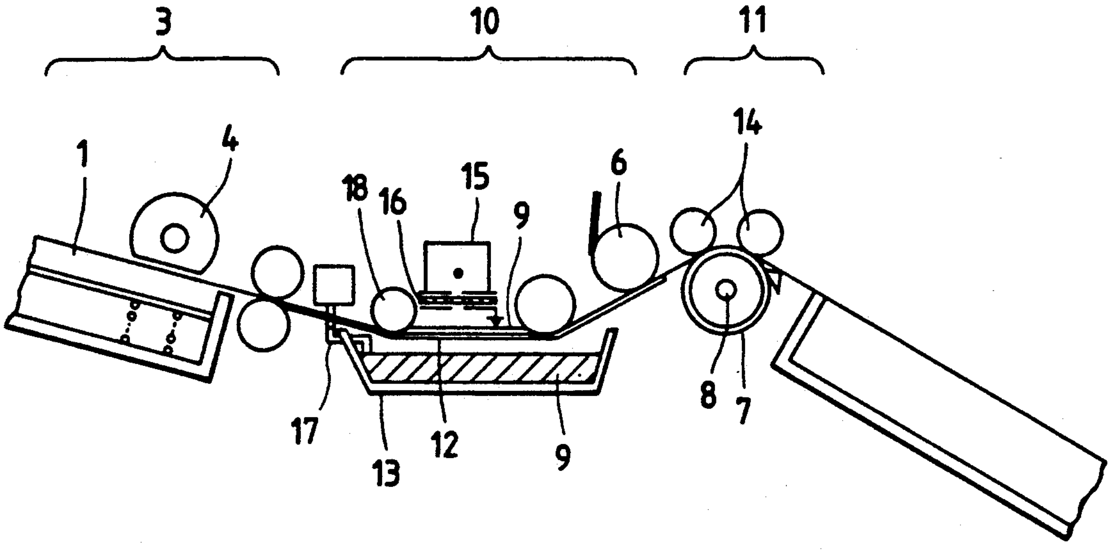
FIG. 1 is an explanatory diagram showing the arrangement of a first example of a wet recording apparatus according to this invention in which an image is recorded directly on a recording sheet.

FIG. 1 shows the arrangement of a first example of a wet recording apparatus according to the invention, in which an image is recorded directly on a recording sheet. As shown in FIG. 1, a recording sheet 1 is supplied from a sheet supplying unit 3 by a sheet supplying roller 4 so that it is passed through a developing unit 10 filled with a developing solution 9. The developing unit 10 contains a predetermined quantity of developing solution supplied from a developing solution container 13 by a developing solution feed pipe 17. Further, the developing solution 9 is applied to the surface of the recording sheet 1 with a constant thickness thereof by a developing solution applying roller 18. An ion generating unit 15 and ion current controlling means 16 are positioned above the recording sheet 1 in such a manner that a predetermined gap is formed between the recording sheet and these devices 15 and 16. A confronting electrode 9 is confronted through the recording sheet 1 with the devices, 15 and 16. After passing through the developing unit, the recording sheet is delivered through a surplus developing solution removing unit 6 to a fixing unit 11 which comprises a heat roller 7 incorporating a heater lamp 8, and a pressure rollers 14.

Figure 2:
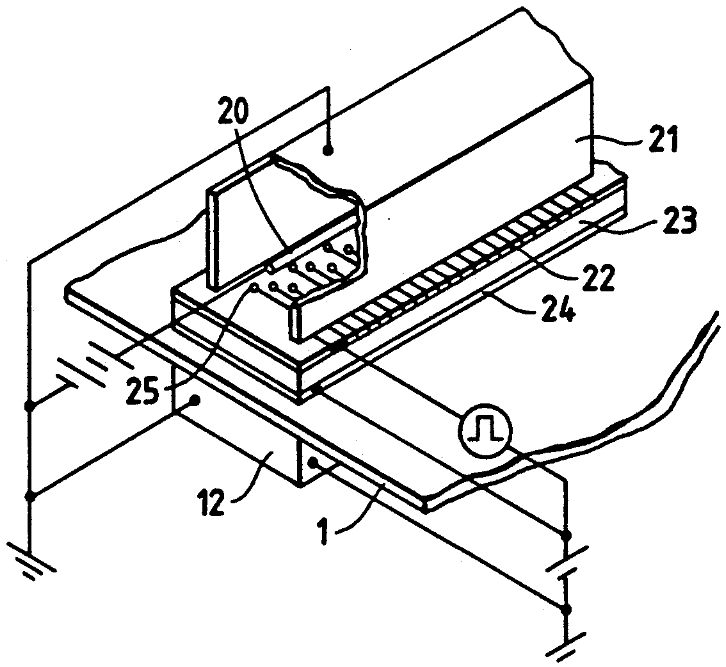
FIG. 2 is a perspective view showing a developing unit in the apparatus of FIG. 1.

FIG. 2 shows the developing unit in more detail which is employed in the wet recording apparatus shown in FIG. 1. The ion generating unit is a so-called "corotron" which comprises a housing 21 of metal such as aluminum, and a tungsten wire 20 0.05 to 0.1 mm in diameter which is shielded with the housing 21 in such a manner that it is spaced about 1 cm from the housing. Upon application of a high voltage of the order of several to 10 KV to the tungsten wire 20, dielectric breakdown occurs with the air, as a result of which positive or negative ions are produced, and discharged through the opening of the housing 21.

The ion current control means is constructed as follows: Openings 25 0.1 mm in diameter are formed at intervals of 300 dpi (dots per inch) in the middle portion of an insulating substrate (of glass epoxy resin) 0.1 mm in thickness in such a manner that they are in four lines and in a skew pattern. A common electrode 24 is formed on one side of the insulating substrate 23, and ring-shaped control electrodes 22 surrounding the respective openings are formed on the other side. The insulating substrate 23 is so positioned that its control electrode side confronts with the ion generating unit. Voltage is applied across the common electrode 24 and a control electrode 22, to control the direction and magnitude of an electric field formed at the opening 25, thereby to control the ion current produced by the ion generating unit. When the direction of the electric field is forward to the ion current, then the ion current is allowed to pass through the opening 25; and when reverse, the ion current is blocked.

Figure 3:
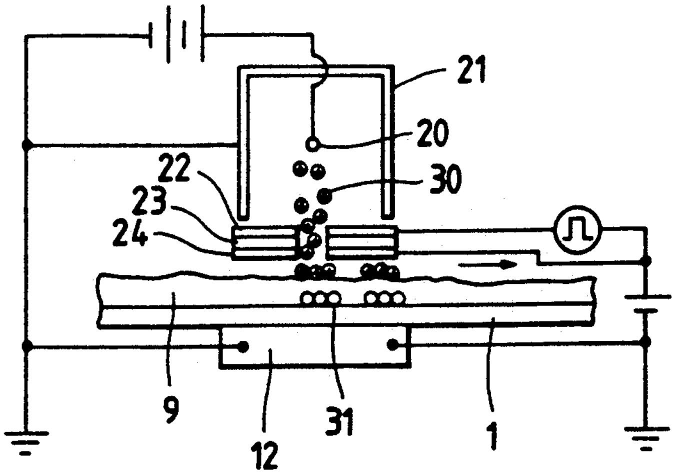
FIG. 3 is an explanatory diagram for a description of an operation of forming an image in the apparatus shown in FIG. 1.

Formation of an image will be described with reference to FIG. 3, which shows the formation of an image with the wet recording apparatus shown in FIG. 1.

When a positive high voltage is applied to the tungsten wire 20, positive ions 30 are produced. When a voltage is applied across a control electrode 22 and the common electrode 24 so as to form an electric field whose direction is from the control electrode towards the common electrode, the ion current flows through the opening 25, thus sticking to the surface of the developing solution. In order to allow the ions 30 to move quickly, a voltage is applied between the common electrode 24 and the confronting electrode 12 so as to form an electric field which is coincided in direction with the ion current. The ions stuck to the surface of the developing solution form an electric field. The developing solution 9 is prepared by dispersing positively charge pigment particles 31 in a solvent. The electric field formed by the positive ions 30 applies an electrostatic force to the pigment particles 31, so that the latter are deposited on the recording sheet. It is not always necessary to deposit the pigment particles 31 on the recording sheet simultaneously when the ions 30 stick to the developing solution surface. That is, the deposition of the pigment particles may be achieved while the recording sheet is moved in the direction of the arrow together with the developing solution, because, as long as the ions 30 are on the developing solution surface, the electric field is kept formed. Hence, the recording speed depends on the speed with which the ions stick to the developing solution surface, which promises a high speed recording operation. The recording sheet, on which the pigment particles have been deposited, is delivered to the surplus developing solution removing unit 6 (FIG. 1) where the surplus developing solution is removed from the recording sheet. This will be described in more detail. The roller which is rotated at a speed different from that of the recording sheet with a small gap maintained between the roller and the recording sheet, is rotated at a peripheral speed different from the sheet moving speed, as a result of which the developing solution in the small gap is removed from the recording sheet by the force attributing to the viscosity of the developing solution itself. Hence, only the pigment particles remain on the recording sheet, thus forming a clear image. The recording sheet thus treated is delivered to the fixing unit 11 (FIG. 1), where the solvent is evaporated from the recording sheet, so that the image is fixed on the recording sheet.

The fixing unit 11 is so designed as to allow the recording sheet to go through the space between the heat roller 7 which is heated by the heater lamp 8 built therein and the pressure rollers 14 whose surfaces are roughened so as not to affect the image on the recording sheet.

In the above-described apparatus, the ion current can be controlled by applying a voltage of the order of 30 to 200 V across the common electrode and the control electrodes. In the case of a recording sheet of size A4, it is possible to obtain a recording speed of 10 ppm. The control voltage may be decreased when the insulator is reduced in thickness, because the strength of an electric field to block the ion current should have a predetermined value.

Figure 4A:
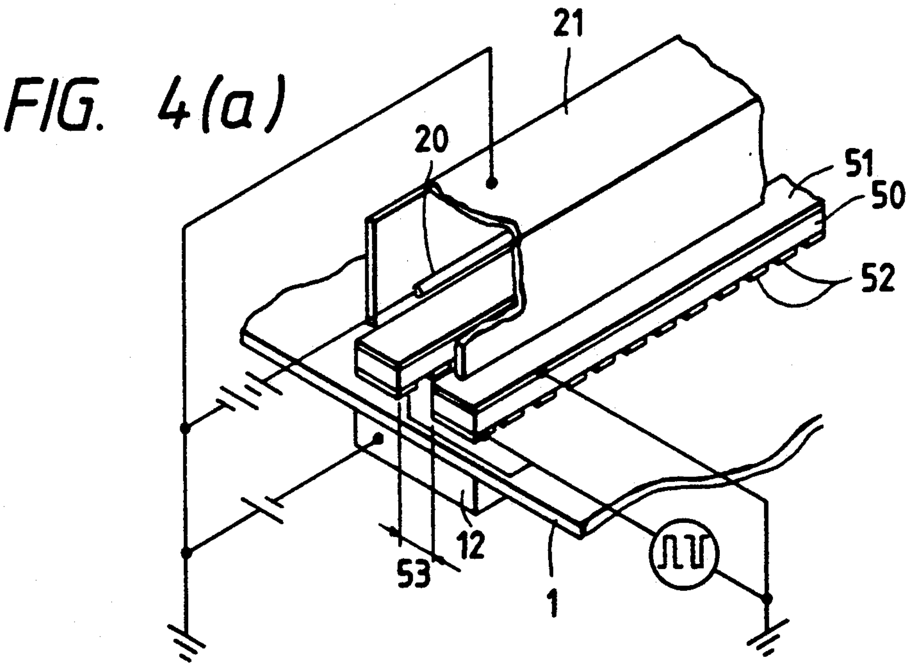
FIG. 4(*a*) is a perspective view showing a part of a second example of the wet recording apparatus according to the invention.
Figure 4B:
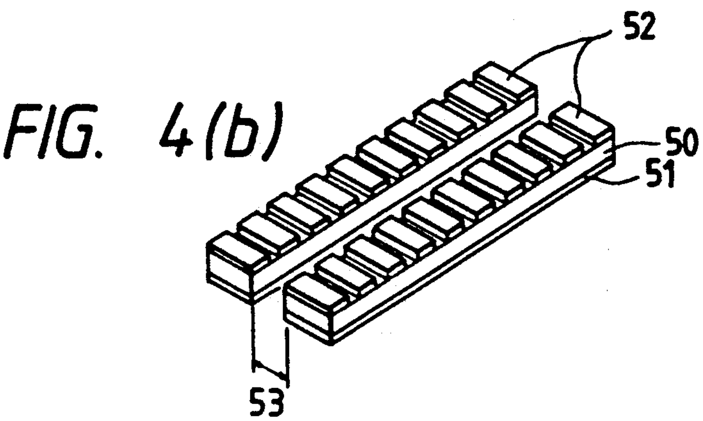

FIG. 4(*a*) outlines the arrangement of a second example of the wet recording apparatus according to the invention. The apparatus comprises: an ion generating unit which is similar in arrangement to that in the first example described above; and ion current controlling means. The ion current controlling means comprises: two insulating substrates 50 0.1 mm in thickness forming a small opening 53 therebetween; a common electrode 51 formed on one side of each insulating substrate 50; and rectangular control electrodes 52 formed on the other side of each insulating substrate 50. That is, the control electrodes on one of the insulating substrates confront with those on the other through the small opening 53. FIG. 4(*b*) shows the ion current controlling means as viewed from the control electrode side. In this example, the common electrodes on the insulating substrates are disposed on the ion generating unit side.

With the apparatus, the ion current control is carried out as follows: With the common electrodes 51 grounded, equal voltages are applied to the control electrodes 52 confronted through the small opening 53 with one another to control the directions and strengths of electric fields formed in the small opening 53.

In the apparatus, the small opening is 0.1 mm in width, the control electrodes are 0.1 mm in width and are arranged at intervals of 0.15 mm, and voltages applied across the common electrode and the control electrodes are ranged from 30 to 200 V.

With the apparatus, a recording operation is carried out as follows: Ions are selectively stuck to the developing solution surface by the ion current controlling means, and so-called "electrophoresis" is caused; i.e., electric fields are formed to move pigment particles suspended in the developing solution towards the recording sheet. Similarly as in the above-described first example of the recording apparatus, the recording sheet to which the pigment particles have been stuck is conveyed to a surplus developing solution removing unit 6 (not shown) and to a fixing unit 11 (not shown).

Where a conductive recording sheet having a conductive surface is used, an image can be formed on the recording sheet with the conductive surface as the confronting electrode.

According to the above-described recording system, a plurality of color developments can be carried out successively in an overlap mode. Hence, a color recording apparatus can be formed in which a recording sheet is conveyed through a plurality of developing units having different color developing solutions, so that a color image is formed on it.

In the case where a recording sheet low in smoothness or a recording sheet into which a developing solution is liable to permeate is used, then pigment particles are liable to stick to the non-image region where no image should be formed. This difficulty may be eliminated by use of a recording sheet whose surface is so treated as to lower the solvent wettability.

As is apparent from the above description, the ion current can be changed by controlling the voltage applied to the ion current controlling means, whereby the area and density of ions stuck to the developing solution surface can be changed, with the result that an image can be recorded with high gradation reproducibility. That is, a high gradation image recording operation can be achieved by controlling the voltage applied to the ion current controlling means. The same effect can be obtained by controlling the voltage applying time.

As was described above, with the wet recording apparatus of the invention, it is unnecessary to cause pigment particles suspended in the developing solution to deposit on the recording sheet simultaneously when ions stick to the surface of the developing solution; that is, since the electric field is present while the ions stick to the surface of the developing solution, the development can be accomplished by the time the recording sheet passes through the surplus developing solution removing unit. Hence, the recording speed depends on the speed at which ions stick to the developing solution surface (hereinafter referred to as "an ion sticking speed", when applicable); that is, a high recording speed can be obtained.

In the invention, instead of the generation of ions, the current of ions is controlled, and therefore the control can be made on a low voltage, several tens of volts. Furthermore, the ion generating unit and the ion current controlling means can be installed in such a manner that they are not in contact with the developing solution. Therefore, they are prevented from the deterioration which is caused by the sticking of pigment particles.

In the above-described first and second examples of the wet recording apparatus according to the invention, the polarity of the ions are equal to that of the charged color material. However, the invention is not limited thereto or thereby. In a third example of the wet recording apparatus of the invention, the ions are opposite in polarity.

Figure 5:
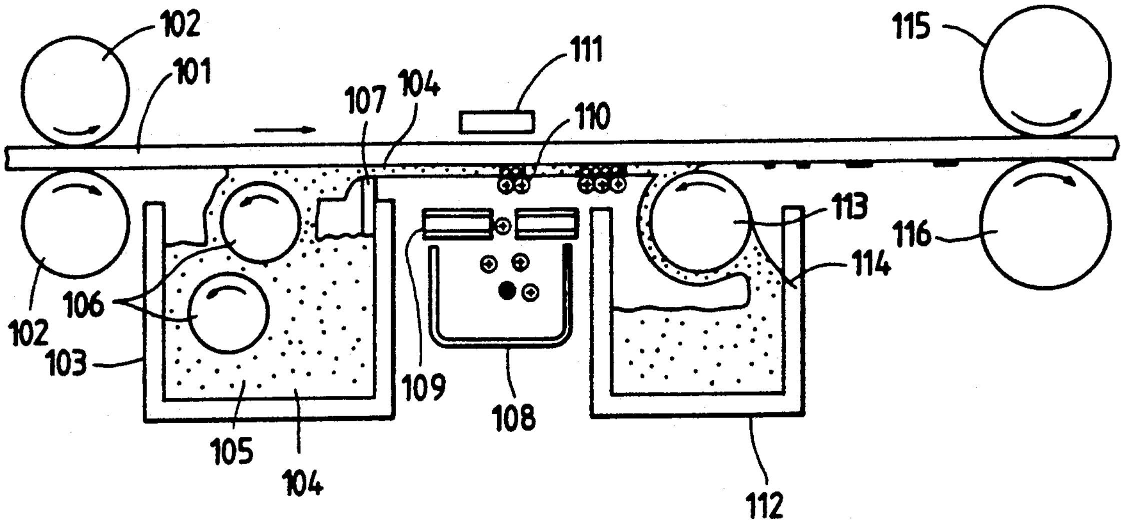
FIG. 5 is an explanatory diagram showing the fundamental arrangement of a third example of the wet recording apparatus according to the invention.

FIG. 5 shows the fundamental arrange of the third example of the wet recording apparatus. As shown in FIG. 5, a recording sheet is supplied from a sheet supplying tray (not shown) by sheet supplying rollers 102. A developing solution 104 is applied to the surface of the recording sheet to a uniform thickness while the recording sheet 101 is passing through a developing solution applying means 103. The developing solution applying means 103 is filled with the developing solution which is prepared by dispersing charged color material particles 105. The developing solution applying means 103 has a pair of supplying rollers 106 and a regulating blade 107 to supply the developing solution 104 to the recording sheet 101 to form a developing solution film uniform in thickness on it. Ion generating means 108 and ion current controlling means 109 are so disposed hat they are at a predetermined distance from the developing solution surface. These means operate to cause ions 110, which are opposite in polarity to the charged color material particles 105, to selectively stick to the developing solution surface according to recording signals. A confronting electrode 111 is confronted through the recording sheet with the ion current controlling means 109, and is held at a potential (negative potential in the example) with which ions can readily stick to the developing solution surface. After a color image is formed on the recording sheet by allowing the ions to selectively stick to the developing solution surface in the above-described manner, the recording sheet is conveyed to surplus developing solution removing means 112, where a surplus developing solution is removed from the recording sheet. This will be described in more detail. The surplus developing solution removing means 112 has a squeeze roller 113 which is so positioned as to form a small gap between itself and the recording sheet, and is turned relative to the recording sheet. The squeeze roller 113 is turned at a peripheral speed different from the speed of movement of the recording sheet, as a result of which the developing solution in the small gap is removed from the recording sheet by the force produced by the viscosity of the developing solution. The surplus developing solution thus removed may stick to the squeeze roller 113; however, it is scraped off with a separating board 114 abutted against the squeeze roller 113. Thus, the recording sheet bearing the color image only is conveyed to a fixing unit comprising a heat roller 115 and a pressure roller 116, and then it is sent to a sheet discharging tray (not shown).

The developing solution is prepared by dispersing negatively charge resin particles including pigment in an insulating carrier liquid solvent.

Figure 6:
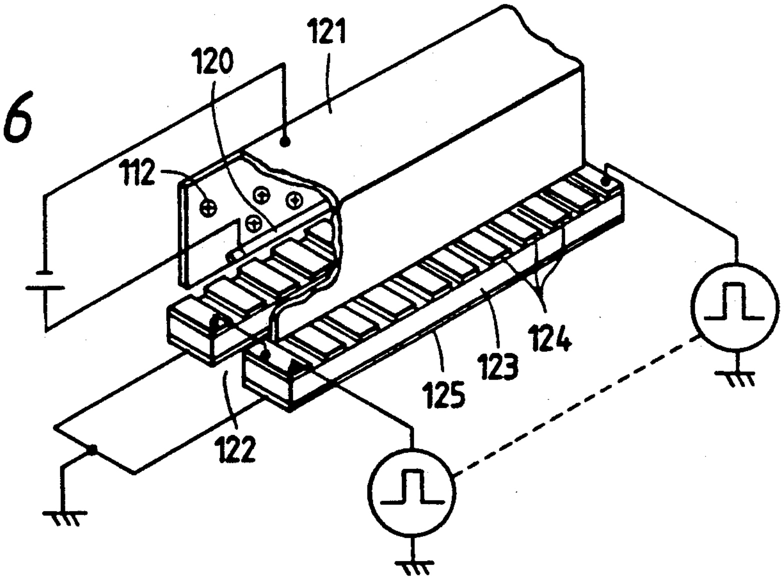
FIG. 6 is a perspective view showing ion generating means and ion current controlling means in the apparatus shown in FIG. 5.

The ion generating means 108 and the ion current controlling means 109 are shown in FIG. 6 in more detail. The ion generating means is a corotron comprising a tungsten wire 120 and a stainless housing 121. Upon application of a high voltage of 5 KV to the tungsten wire 120 of 0.05 mm in diameter, corona discharge takes place, so that the housing 121 is filled with positive ions. The ion current controlling means comprises: two insulating substrates 123 of 0.1 mm in thickness forming a small opening 122 therebetween; a common electrode 125 formed on one side of each insulating substrate 123; and rectangular control electrodes 124 formed on the other side of each insulating substrate 123. That is, the control electrodes on one of the insulating substrates confront with those on the other through the small opening 122. With the apparatus, the ion current control is carried out as follows: With the common electrodes grounded, equal voltages are applied to the control electrodes confronted through the small opening with one another to control the directions and strengths of electric fields formed in the small opening. In the example, the small opening is 0.1 mm in width, the control electrode pitch is set to 1/300 dpi, and voltages ranged from 30 to 200 V are applied to the control electrodes.

Figure 7:
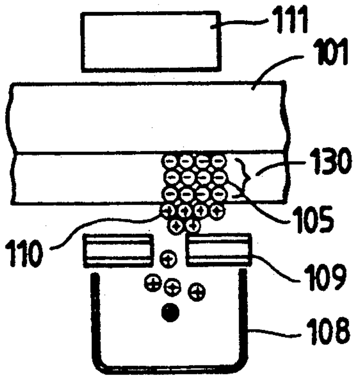
FIG. 7 is an explanatory diagram for a description of an operation of forming an image in the apparatus shown in FIG. 5.

Now, formation of an image with the wet recording apparatus thus organized will be described with reference to FIG. 7.

When ions 110 stick selectively to the developing solution surface according to recording signals, an electrostatic attractive force is induced between the ions and the color material particles 105 charged opposite in polarity and suspended in the developing. As a result, electrophoresis occurs with the color material particles 105, so that the latter are gradually moved towards the recording sheet, thus forming a color image 130 on it. The number of ions to be stuck to the developing solution surface should be large enough to allow the color material particles to reach the surface of the recording sheet. As shown, the ions are held on the developing solution surface, because the developing solution dispersion medium is insulating. The electrophoresis causes the material particles to move to confront through the developing solution surface with the ions. Thus, the formed color image is high in picture quality, conforming the pattern of ions arranged selectively with high fidelity.

With the wet recording apparatus, the developing solution was applied to a thickness of 30 μm, and the ion current was applied for 10 msec to form a toner image having a density of OD 1.5. In the wet recording apparatus, the image forming speed depends on the speed at which the ions stick to the developing solution surface instead of the electrophoresis speed of color material particles. Hence, with the apparatus, an image can be recorded at high speed.

In the apparatus, the voltages applied to the control electrodes or the period of time for which voltages are applied to the control electrodes is controlled so that the number of ions stuck to the developing solution surface or the area occupied by the ions on the developing solution surface is controlled for every picture element. Hence, a color image can be formed with high gradation reproducibility. In addition to the ordinary recording sheet, a conductive recording sheet having a conductive surface, and an electrostatic recording sheet having a dielectric surface may be used in the wet recording apparatus of the invention.

As was described above, in the wet recording apparatus of the invention, the color material particles charged opposite in polarity to the ions are moved to confront through the developing solution surface with the ion by electrophoresis. Thus, with the apparatus, the formed color image is high in picture quality, conforming the pattern of ions arranged selectively with high fidelity. Furthermore, the apparatus of the invention is free from the theoretical limitation that the electrophoresis of color material particles takes place only when voltage is applied to the recording electrodes. Hence, the image forming speed depends on the speed of ions sticking to the developing instead of the electrophoresis speed of color material particles; that is, a color image can be formed at high speed.

A fourth example of the wet recording apparatus, which is a printer in which a transferring element is used to transfer an image onto a recording sheet, will be described with reference to FIG. 8.

Figure 8:
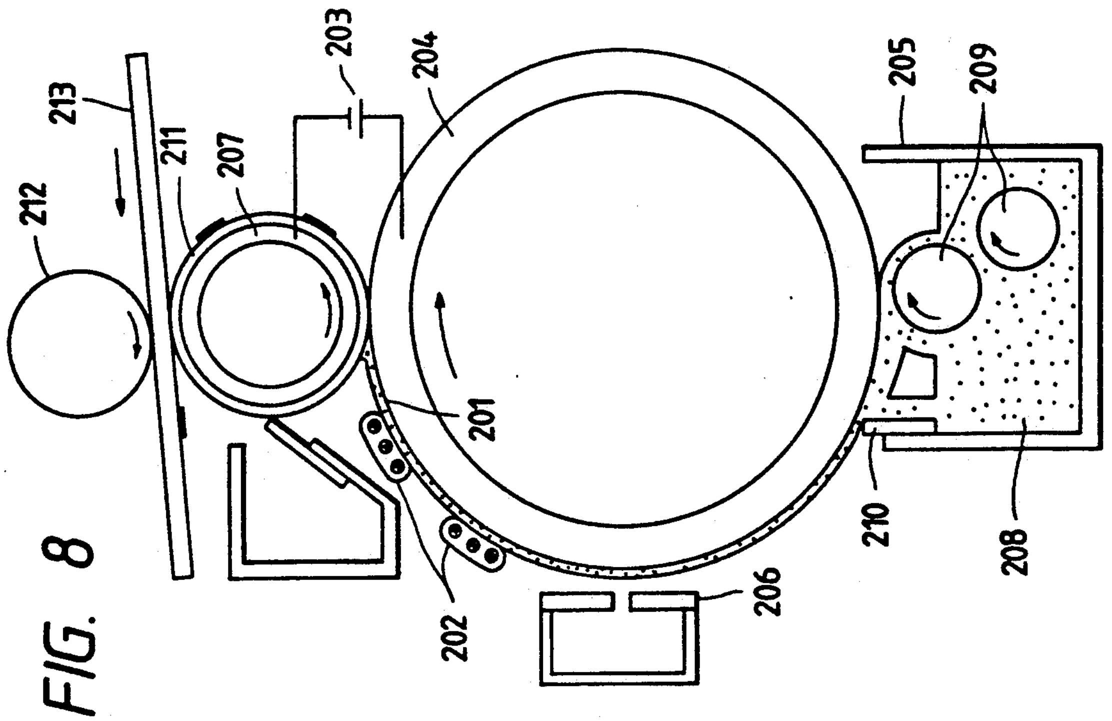
FIG. 8 is an explanatory diagram showing the arrangement of a fourth example of the wet recording apparatus according to the invention, a printer, in which an image transferring element is used to transfer an image onto a recording sheet.

The apparatus, as shown in FIG. 8, comprises; a hollow drum shaped image bearing structure 204 made of metal; and a developing solution applying unit 205, an ion current controlling unit 206 and a transferring drum 207 which are arranged around the image bearing structure 205.

The developing solution applying unit 205 contains a developing solution 208 which is prepared by dispersing charged resin particles including pigment (hereinafter referred to as "toner particles", when applicable) in an insulating carrier liquid solvent. The developing solution applying unit 205 has a pair of coating rollers 209, which are used to agitate the developing solution to stabilize the dispersion of toner particles therein, and to apply the developing solution to the surface of the image bearing structure 204. The unit 205 further comprises a regulating board 210 to control the thickness of a developing solution film formed on the image bearing structure 204. In the apparatus, the toner particles are charged positively.

Figure 9:
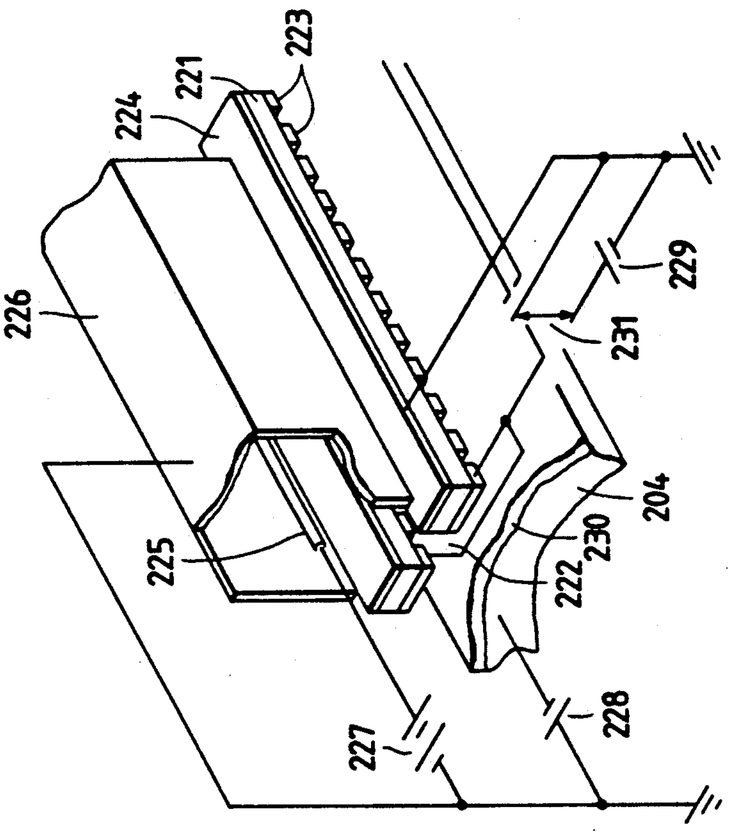
FIG. 9 is a perspective view showing the arrangement of an ion current controlling unit in the apparatus shown in FIG. 8.

The ion current controlling unit 206 is shown in FIG. 9 in more detail. The ion current controlling unit of FIG. 9 is different from that shown in FIG. 4(*a*) in that there is provided a switching means 231 for selectively controlling the voltage applied to control electrodes 223. As shown in FIG. 9, a pair of insulating substrates 221 0.1 mm in thickness are provided with an opening 222 therebetween, a common electrode 224 is formed on one side of each of the insulating substrates, and the control electrodes 223 are formed on the other side at intervals of 1/300 inch. An ion generating unit, namely, a "corotron" is provided above the ion current controlling unit 206. More specifically, the ion generating unit is made up of a tungsten wire 225 0.05 mm in diameter, and a stainless housing 226 which covers the tungsten wire 225 in such a manner that the housing 226 is spaced about 10 mm from the tungsten wire 225. The wire, the housing, common electrodes, and control electrodes are connected to power sources 227, 228 and 229 as shown in FIG. 9, providing potential differences with respect to the image bearing structure 204. Voltage is applied to the control electrodes 223 through the switching means 231.

The operation of the ion current controlling unit thus constructed will be described. Upon application of a high voltage, several to several tens of kilo-volts (KV), to the wire 225, positive ions are generated. Where an electric field is formed between the common electrode 224 and the control electrode 223 in such a manner that the latter 223 is positive, the ion current there is blocked. Where, on the other hand, the control electrode and the common electrode are held at the same potential, the ions are allowed to pass through the opening and affected by an electrostatic force under the electric field formed between the ion current controlling unit and the image bearing structure, to stick to the developing solution surface 230.

The transferring drum 207 is made up of a hollow metal drum covered with an elastic layer 211.

With the apparatus thus constructed, an image is formed as follows: The developing solution is applied to the surface of the image bearing structure 204 to a predetermined thickness, and the ion current controlling unit is operated to selectively stick positive ions to the surface of the developing solution layer. Since the developing solution dispersion medium is insulating, the ions are held on the developing solution surface, so that an electric field is formed between the ions and the image bearing structure. Since the toner particles are positively charged, the electric field acts to move the toner particles towards the image bearing structure; that is, electrophoresis occurs with the toner particles so that the latter are moved towards the image bearing structure to form a toner image thereon. In FIG. 8, the toner image formed on the image gearing structure is indicated at 201, and the positive ions on the developing solution are indicated at 202.

Under this condition, the transferring drum 207 is abutted against the image bearing structure 204, and a voltage is applied across the image bearing structure 204 and the metal drum part of the transferring drum 207 in such a manner that the transferring drum 207 is negative. As a result, an electrostatic force acts to transfer the toner image only onto the transferring drum. In this operation, the transferring drum 207 is pushed against the image gearing structure 204, the surplus of developing solution is squeezed out; that is, it is not transferred over to the transferring drum. Thereafter, the transferring drum is pushed through the recording sheet 213 by the pressure roller 212, so that the wet toner image is mechanically transferred from the transferring drum onto the recording sheet 213. The recording sheet may be delivered to a fixing station to dry the wet toner image on the recording sheet. In this invention, a natural drying method is employed.

In the apparatus, the outer cylindrical walls of the image bearing structure 204 and the transferring drum 207 are made flat and smooth, so that the image can be transferred without deterioration. The outer cylindrical wall of the transferring drum 207 is elastic. Hence, even in the case where a recording sheet low in smoothness is employed, the elastic outer cylindrical wall follows the surface of the recording sheet, so that the toner image is satisfactorily transferred onto the recording sheet under pressure. The ions on the developing solution surface apply electrostatic field to the toner particles even after passing through the ion current controlling means. Therefore, the operation of forming an image on the image bearing structure may be accomplished before the image transferring operation; that is, the time required for electrophoresis of the toner particles is not limited. Thus, in the wet recording apparatus, it is unnecessary to provide the high electric field, nor to provide the small gap, and the recording speed is high, being not limited by the speed of movement of toner particles.

Figure 10:
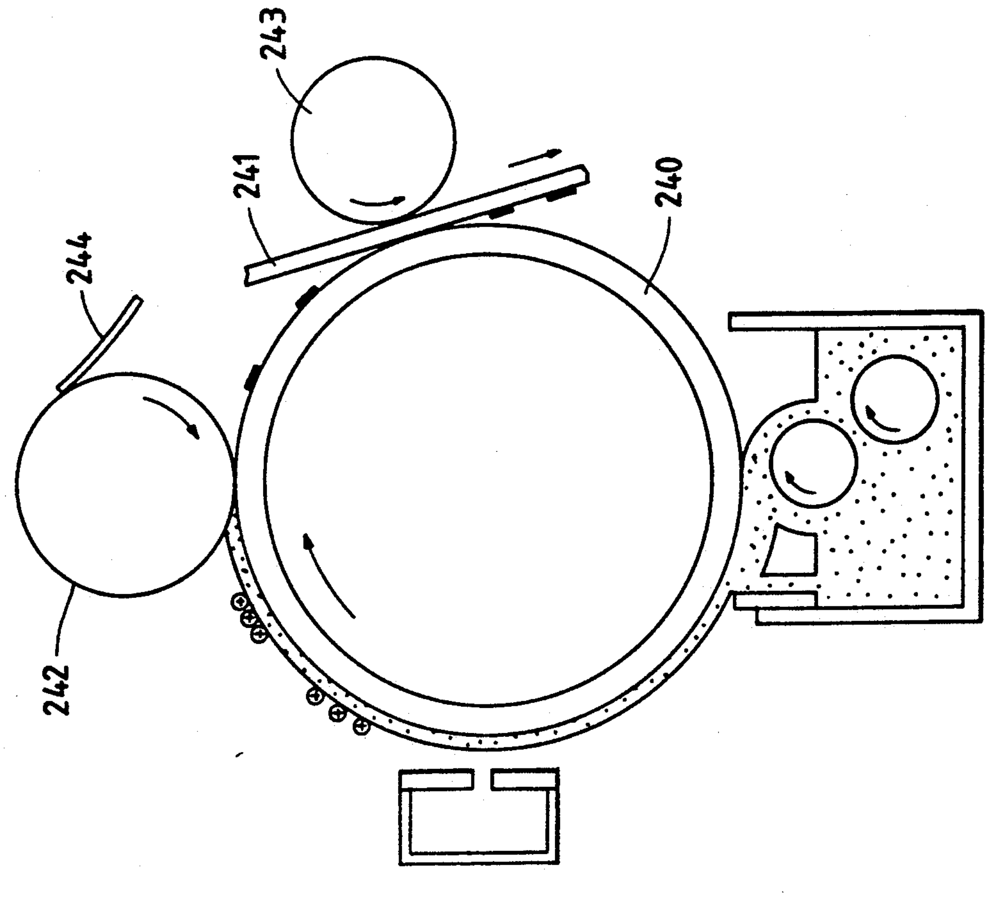
FIG. 10 is an explanatory diagram showing the arrangement of a fifth example of the wet recording apparatus according to the invention, a printer.

The fifth example of the wet recording apparatus according to the invention will be described with reference to FIG. 10. In the apparatus, a pressure roller 243 is pushed against an image bearing structure 240 through a recording sheet 241 at an image transferring position. A squeeze roller 242 is provided before the image transferring position. The squeeze roller 242 is rotated at a peripheral speed different from that of the image bearing structure 240 with a minute gap therebetween, thereby removing the surplus of developing solution, to which a force derived from a fluid viscosity has been applied, from the image bearing structure 231. A separating plate 244 abuts against the squeeze roller 242 so as to scrape the surplus of developing solution from the squeeze roller 242. As a result, the image bearing structure 240, bearing toner images only, is confronted with the recording sheet 241, so that the toner images are mechanically transferred onto the latter 241 under pressure. The other components and operations are the same as those in the above-described fourth example of the apparatus.

In the apparatus thus constructed, the toner image transferred onto the transferring roller is transferred again onto the recording sheet under pressure. Hence, with the apparatus, the toner image is satisfactorily transferred onto the recording sheet, irrespective of the smoothness of the latter.

Furthermore, in the apparatus, toner images are formed by controlling ion current instead of high voltage. Thus, the apparatus is high in recording speed.

In addition, in the apparatus, the ion generating unit is not in contact with the developing solution; that is, it will not be soiled with the developing solution, and therefore the maintenance of the ion generating unit is simple.

Figure 11:
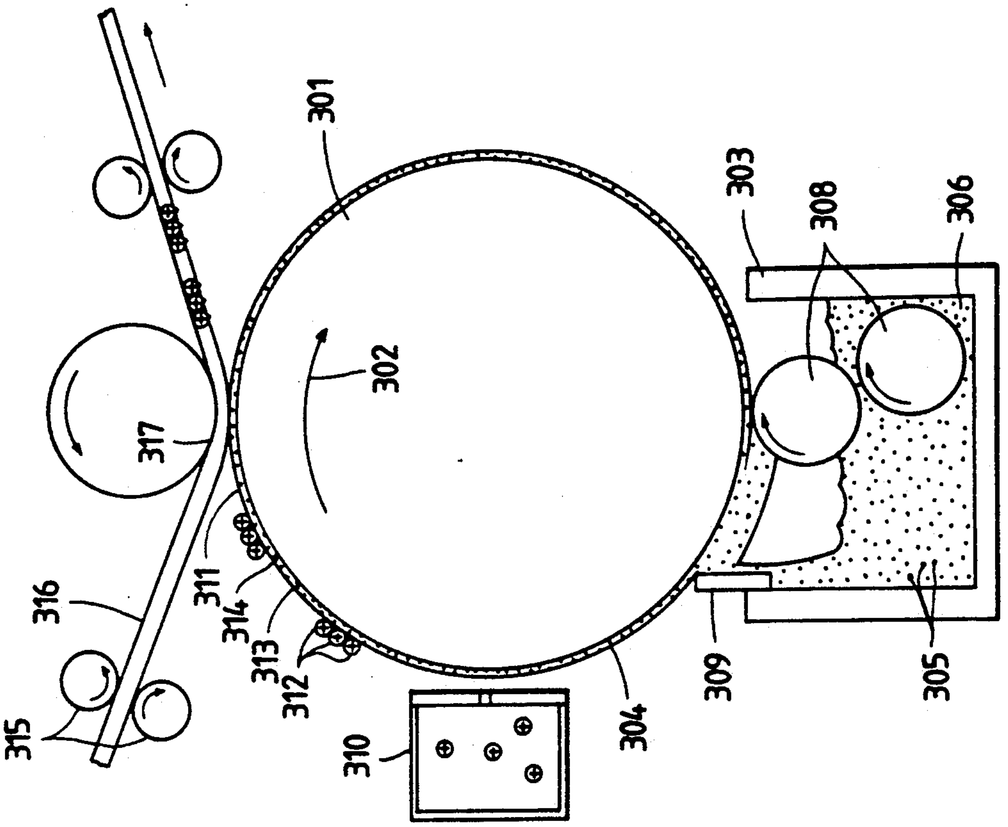
FIG. 11 is an explanatory diagram showing the fundamental arrangement of a sixth example of the wet recording apparatus according to the invention.

In the above-described examples of the wet recording apparatus, the color material particles are the same in polarity as the ions; however, the invention is not limited thereto or thereby. Now, a sixth example of the wet recording apparatus according to the invention will be described with reference to FIG. 11, in which the color material particles are opposite in polarity to the ions.

In the apparatus, a metal drum, namely, a developing solution film bearing structure 301 is rotated in the direction of the arrow 302. As the structure 301 passes through developing solution applying means 303, a uniform developing solution film 304 is formed on the outer cylindrical wall of the structure 301. The developing solution applying means 303 is filled with a developing solution 306 which is prepared by dispersing charged color material particles 305 in a solvent. The developing solution applying means 303 has a pair of supplying roller 308 to apply the developing solution to the developing solution film bearing structure 301 and a regulating board 309 to form a uniform developing solution on the latter 301. Ion current controlling means 310 is disposed in such a manner that a small gap is formed between the ion controlling means 310 and the surface 311 of the developing solution film. The ion current controlling means 310 causes ions 312 to stick to the developing solution film surface 311 according to recording signals. The ions 312 stuck to the developing solution film surface 311 apply electrostatic force to the charged color material particles suspended in the developing solution 304; that is, electrophoresis occurs with the charged color material particles. As a result, a charged color material particle distribution pattern 314 is formed on a part 313 of the developing solution film surface (hereinafter referred to as "a developing solution film surface part 313", when applicable) in correspondence to the pattern of the ions stuck to the developing solution film surface. In the apparatus, the color material particles 305 are opposite in polarity to the ions 312, so that the color material particles 305 and the ions 312 electrostatically attract each other. A recording sheet 316 is supplied from a sheet supplying tray (not shown) by a pair of sheet supplying rollers 315, and is brought into contact with the developing solution film surface 311 at an image transferring section 317, where the developing solution film surface part 313 on which the charge color material particle distribution pattern 314 has been formed is transferred on to the recording sheet 316. Thereafter, the recording sheet is delivered, as a recorded sheet, to a sheet discharging tray (not shown).

The ion current controlling means 310 is the same as that shown in FIG. 6. In this case, it has been determined through experiments that the voltages applied to the pairs of control electrodes may be of the order of several tens of volts.

The number of ions to be emitted can be controlling by adjusting the voltages applied to the pairs of control electrodes or the time for which the voltages are applied to them. Hence, the density or area of the ions stuck to the developing solution film surface can be controlled. Thus, with the apparatus, an image can be recorded with high gradation reproducibility.

As was described above, with the apparatus of the invention, the ions stuck to the developing solution film surface by the ion current controlling means remain applying electrostatic force to the charge color material particles in the developing solution film. Therefore, the apparatus of the invention is free from the theoretical limitation that, in the conventional wet recording apparatus, electrophoresis occurs with color material particles only when voltage is applied to the control electrode. Hence, in the apparatus of the invention, an image recording operation can be achieved much more quickly than in the conventional wet recording apparatus. Furthermore, in the apparatus of the invention, the ion current controlling means handles low voltage, several tens of volts, which eliminates the necessity for using an expensive control circuit.

In the conventional wet recording apparatus, the recording electrode is in the developing solution, so that its end face may be soiled, or the color material particles may stick to the recording electrode to deteriorate the latter. On the other hand, in the apparatus of the invention, the ion current controlling means is not in contact with the developing solution, and therefore the apparatus is free from the above-described difficulties accompanying the conventional wet recording apparatus.

The above-described recording system may be developed into a color recording device for forming a pictorial color image in which a plurality of developing solution applying means are used which are different in developing solution color, and the operation of forming a developing solution film on the developing solution film bearing structure, the operation of sticking ions selectively to the developing solution film surface, and the operation of transferring an image onto a recording sheet are repeatedly carried out.

Figure 12:
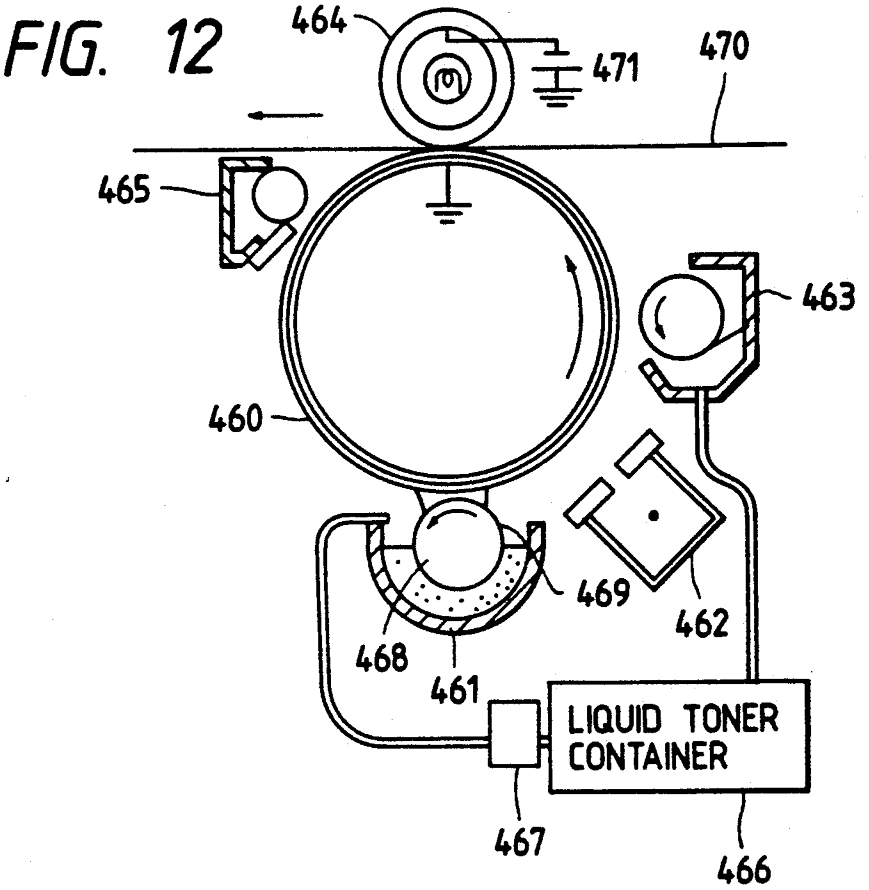
FIG. 12 is an explanatory diagram showing the arrangement of a seventh example of the wet recording apparatus according to the invention.

FIG. 12 shows a seventh example of the wet recording apparatus according to the invention. The apparatus comprises: a conductive elastic image bearing structure 460 which is made up of a metal hollow drum and an elastic rubber layer; and sub-processing units, namely, a liquid toner applying unit 461, an ion current controlling unit 462, a surplus toner removing unit 463, a transferring unit 464, and a cleaning unit 465 are arranged, in the stated order, around the image bearing structure 460 in the direction of the arrow. A liquid toner containing unit 466 is connected through a pump 467 to the liquid toner applying unit 461 so as to supply a suitable quantity of toner to the latter 461, and it is further connected to the surplus toner removing unit 463 to receive the liquid toner removed by the latter 463.

The liquid toner applying unit 461 comprises a roll 468 having grooves in its surfaces, and a regulating board 469. The regulating board 469 controls the thickness of a liquid toner layer applied to the conductive elastic image bearing structure 460 with the aid of the depth and pitch of the grooves formed in the roll 468. After a liquid toner layer is formed on the image bearing structure 460 to a thickness of 5 to 50 μm by the liquid toner applying unit 461, the ion current controlling unit 462 causes ions to selectively stick to the surface of the liquid toner layer. Since the liquid toner dispersion medium is dielectric, the positive ions are held on the surface of the liquid toner layer, thus forming an electric field with the image bearing structure. The liquid toner particles have been charged positive. Therefore, the electric field applies electrostatic force to the liquid toner particles to move the latter towards the conductive elastic image bearing structure; that is, electrophoresis occurs with the liquid toner particles, so that the latter are moved towards the image bearing structure to form a toner image thereon. Even it the polarity of the ions controlled by the ion current controlling unit 462 is opposite to that of the charged liquid toner particles, the electric fields formed by the ions stuck to the liquid toner layer surface form an toner image on the elastic image bearing structure. As the liquid toner layer passes through the surplus toner removing unit 463, the surplus of toner in the non-image region is removed from the image bearing structure. The image bearing structure, on which the toner image has been formed, is abutted against the transferring unit 464 through a recording sheet 470 supplied by a sheet supplying unit (not shown). Under this condition, upon application of voltage by an external power source 471, the toner image is transferred to the recording sheet 470, and is then fixed thereon. The toner remaining on the image bearing structure is recovered by the cleaning unit 465. Thereafter, the following image recording operation is started.

Figure 13:
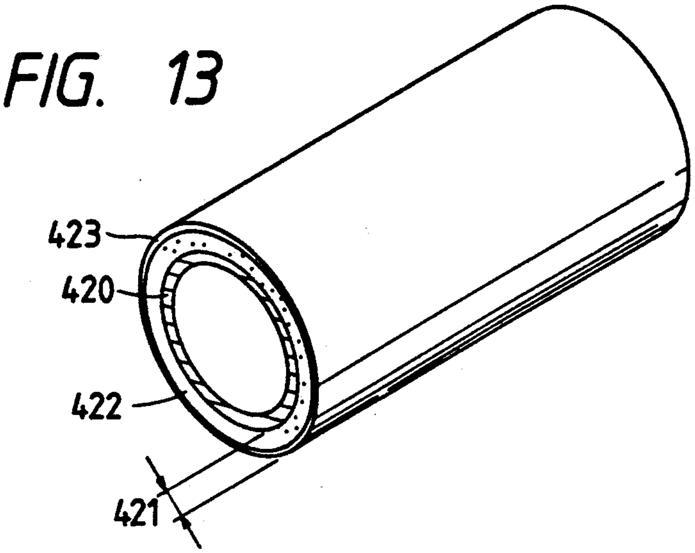
FIG. 13 is a perspective view showing the construction of an elastic image bearing structure employed in the apparatus shown in FIG. 12.

The elastic image bearing structure 460, as shown in FIG. 13, comprises: the metal hollow drum 420; and the elastic layer 421 which is made up of a conductive rubber layer 422 formed on the metal hollow drum 420, and a dielectric layer 423 formed on the conductive rubber layer 422. In the apparatus, dielectric layer 423 is 5 to 30 μm in thickness, and 2.5 to 3.5 in specific inductive capacity, and the conductive rubber layer 422 is 0.5 to 2 mm in thickness, and $10^9$ Ωcm or less in specific resistance. Since the outermost layer of the image bearing structure is the dielectric layer 423, it can bear the charged toner image which is formed by the ion current controlling unit 423.

Figure 14:
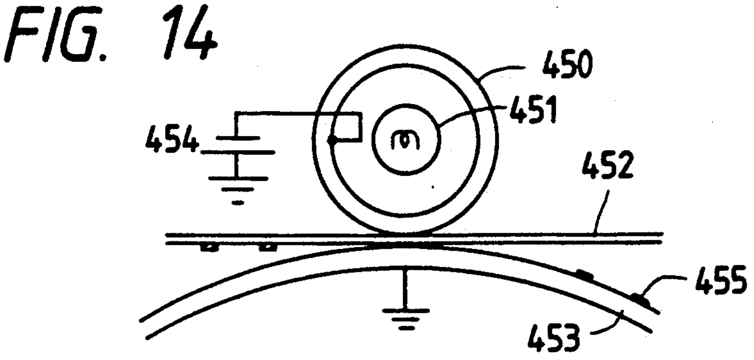
FIG. 14 is an explanatory diagram for a description of an image transferring operation in the apparatus shown in FIG. 12.

Now, the image transferring operation of the apparatus shown in FIG. 12 will be described with reference to FIG. 14.

The transferring unit comprises: a metal hollow drum 450; and a heat source, namely, a halogen lamp 451 built in the metal hollow drum 450. The halogen lamp is used to keep the temperature of the surface of the drum 450 in a range of from 150° C. to 200° C. The metal hollow drum 450 is pushed against the elastic image bearing structure 453 through the recording sheet 452. Voltage is applied to the metal hollow drum 450 by the power source 454. The voltage thus applied forms a transferring electric field, which applies an electrostatic force to the toner image 455 formed on the elastic image bearing structure which is charged positive, so that the toner image is urged towards the recording sheet, while the transferring unit is pushed against the elastic image bearing structure 453 through the recording sheet. As a result, the toner image is transferred onto the recording sheet. By coating the cylindrical wall of the elastic image bearing structure 453 with fluorine or silicon, the toner image is more readily transferred onto the recording sheet. While the toner image is transferred onto the recording sheet, the latter is heated from behind, so that the toner image is not only stuck to the recording sheet but also fixed thereon with the toner being molten. In this operation, owing to the elastic image bearing structure 453, the toner image is transferred onto the recording sheet with high fidelity irrespective of the smoothness of the latter.

The ion current controlling means may be the same as those in the above-described wet recording apparatuses. Alternatively, it may be so designed that stylus-shaped electrodes are arranged near the cylindrical wall of the elastic image bearing structure, and the electric fields around the electrodes are selectively controlled to allow the liquid toner particles to stick to the elastic image bearing structure.

In the wet recording apparatus thus constructed, an electrostatic force and a force of depression are applied to the toner image on the elastic image bearing structure while the recording sheet is being heated, so that the toner image is transferred and fixed with the toner being molten. Furthermore, the image bearing structure has the elastic layer as its outermost layer, and therefore the toner image can be transferred onto the recording sheet with high fidelity irrespective of the smoothness of the latter, and can be fixed thereon. Furthermore, the apparatus can be simplified in construction and reduced in dimension. This is another effect of the invention.

Figure 15:
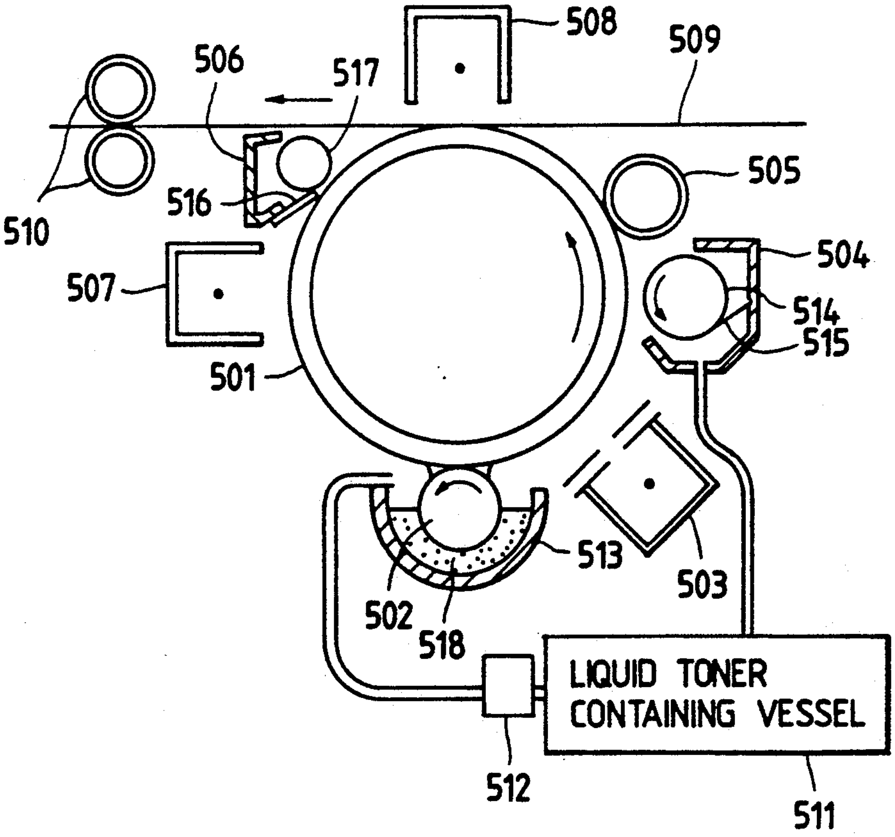
FIG. 15 is an explanatory diagram showing the arrangement of an eighth example of the wet recording apparatus according to the invention, in which a block copy is formed during one revolution of an image bearing structure, and thereafter, with the aid of the block copy, the same image is formed repeatedly.

FIG. 15 shows the arrangement of an eighth example of the wet recording apparatus in which a block copy is formed during one rotation of an image bearing structure, and thereafter, with the aid of the block copy, the same image is repeatedly formed.

The apparatus, as shown in FIG. 15, comprises: a hollow-drum shaped conductive image bearing structure 501; a liquid toner coating roller 502; an ion current controlling unit 503; a surplus toner removing unit 504; heating means 505; a cleaning unit 506; and charging units 507 and 508. Those devices 502 through 508 are arranged around the conductive image bearing structure 501. A recording sheet 509 is supplied by means of sheet supplying rollers (not shown). After a color material image being formed on the recording sheet 509, the latter 509 is conveyed to a fixing unit 510 comprising a heat roller and a pressure roller. The apparatus further comprises a liquid toner developing solution containing vessel 511 which is connected through a pump 512 to the liquid toner applying unit 502 so as to supply a suitable quantity of liquid toner to the latter 502, and it is further connected to the surplus toner removing unit 504 to receive the surplus of toner removed by the latter 504.

The liquid toner 518 is prepared by dispersing in an insulating carrier solvent positively charged resin particles including pigment. The liquid toner coating roller 502 has grooves in its cylindrical wall, to apply the liquid toner 518 to the cylindrical wall of the conductive image bearing structure 501. The thickness of a liquid toner layer is controlled by a regulating board 513 in association with the depth and pitch of the grooves formed in the coating roller 502.

Figure 16:
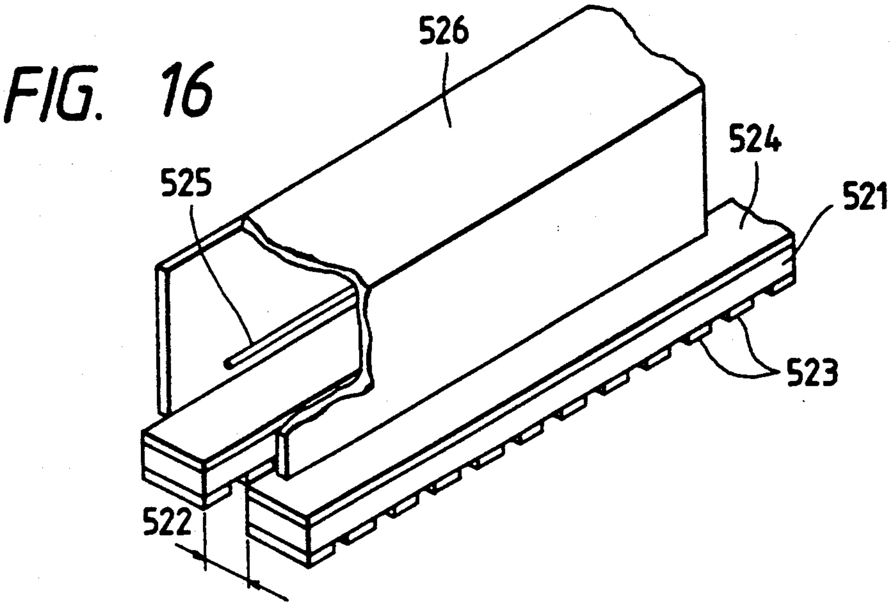
FIG. 16 is a perspective view showing an ion current controlling unit in the apparatus shown in FIG. 15.
Figure 17:
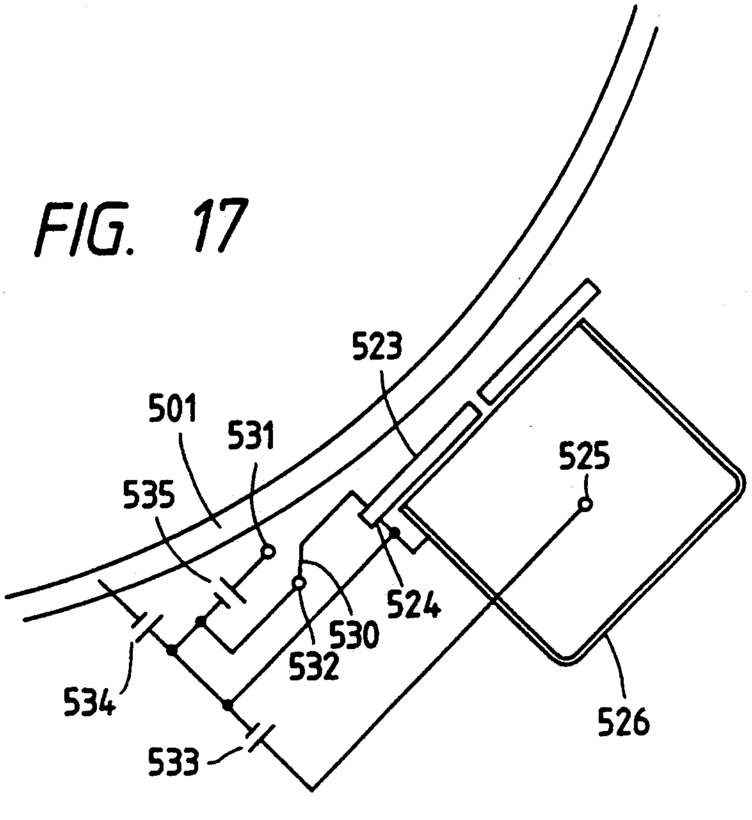
FIG. 17 is an explanatory diagram showing the electrical connection of the ion current controlling unit in the apparatus shown in FIG. 15.

The ion current controlling unit 503 is shown in FIG. 16 in more detail. The unit 503 comprises: an insulating substrate 521 0.1 mm in thickness which has an opening 522 in the middle portion. A common electrode 524 is formed on one side of the insulating substrate 521, and control electrodes 523 are formed on the other side with a pitch of 300 dpi (dots per inch). An ion generating unit, namely, a "corotron" is provided above the insulating substrate 521. The ion generating unit comprises: a tungsten wire 525 0.05 mm in diameter; and a stainless housing 526 covering the tungsten wire 525 in such a manner that the housing 526 is spaced about 5 mm from the tungsten wire 525. The wire 525, the housing 526, the common electrode 524, and the control electrodes 523 are connected to power sources 533, 534 and 535 as shown in FIG. 17, thus providing potential differences with respect to the conductive image bearing structure 501. When a switch 530 is set to a terminal 531 to block the current of positive ions produced in the ion generating unit, and it is set to a terminal 532 to cause positive ions to stick to the liquid toner layer on the conductive image bearing structure 501 as required. In the apparatus, the power sources 533, 534 and 535 are of 5 KV, 500 V and 200 V, respectively, for instance. With those power sources, an ion current controlling operation is so performed that positive ions produced around the wire 525 reach the surface of the liquid toner layer through the opening 522.

The surplus toner removing unit 504 (FIG. 15) has a squeeze roller 514 which is positioned in such a manner that there is a small gap between itself and the conductive image bearing structure 501. The squeeze roller 514 is rotated at an outer peripheral speed different from that of the conductive image bearing structure 501. As a result, a force attributing to liquid viscosity is applied to the liquid toner in the small gap, thereby to remove the latter from the conductive image bearing structure 501. A separating board 515 is abutted against the squeeze roller 514, to remove a surplus of toner from the latter 514.

The heating means 505 comprises: a roll; and a heating lamp built in it; that is, the heat means is of heat roll type.

The cleaning unit 506 comprises an urethane blade 516 and a sponge roller 517 which are rockably installed. The blade 516 and the roller 517 are brought into contact with the conductive image bearing structure 501 to clean the latter; i.e., to remove the color material image therefrom.

An operation of forming a block copy, and an operation of copying an original image will be described with reference to FIGS. 18(*a*) and 18(*b*).

Figures 18A, 18B, 18C, 18D, 18E, 18F, 18G, 18H:
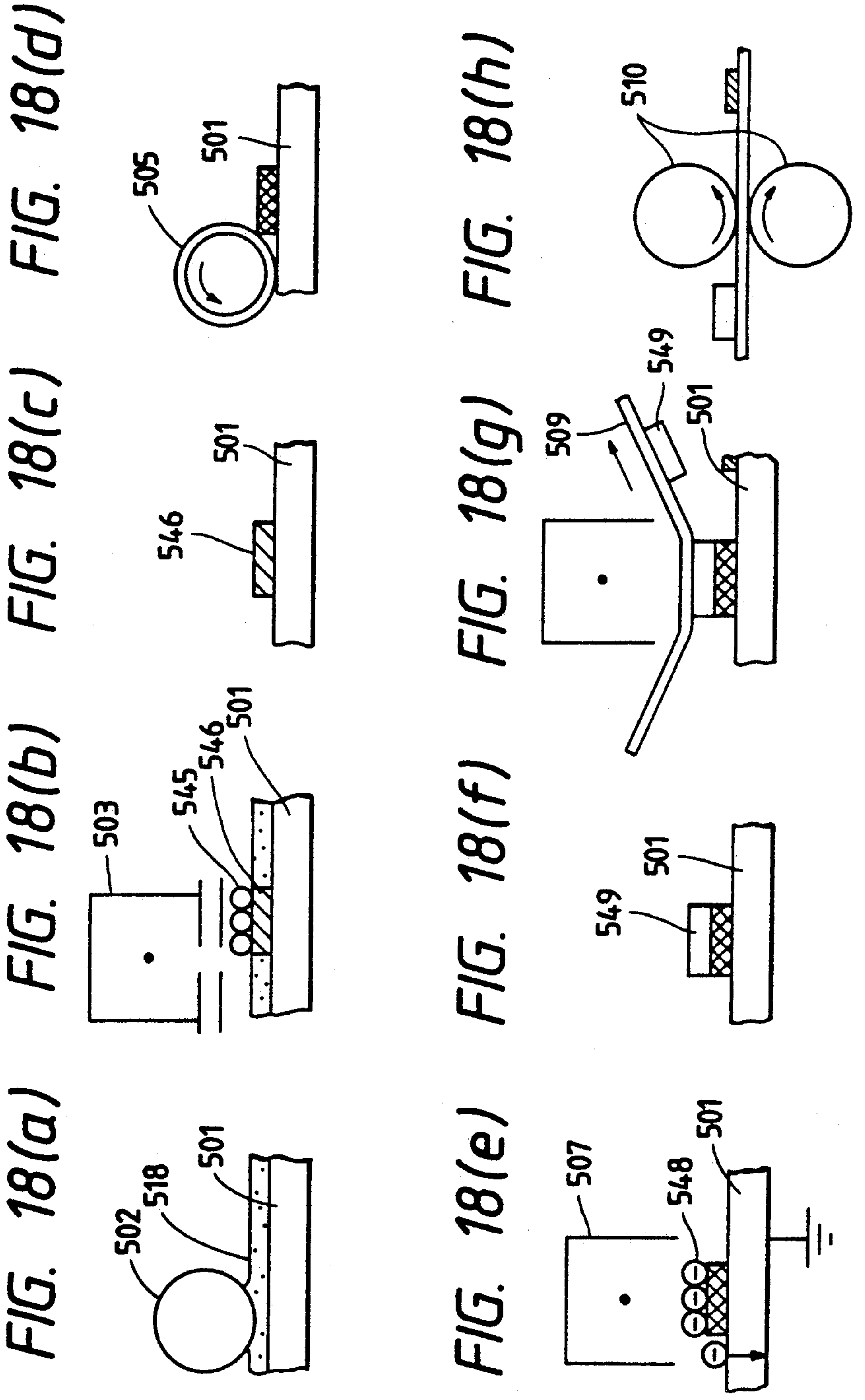
FIGS. 18(*a*) through 18(*h*) are explanatory diagrams for a description of an image recording process in the apparatus shown in FIG. 15.

The operation of forming a block copy is carried out as shown in FIG. 18(*a*) through FIG. 18(*d*). First, the liquid toner applying roller 502 is operated to apply the liquid toner 518 is applied to the conductive image bearing structure 501 to a uniform thickness of 5 to 50 μm (FIG. 18(*a*)). Under this condition, the ion current controlling unit 503 is operated to cause the ions 545 to stick selectively to the surface of the liquid toner layer (FIG. 18(*b*)). Then, since the liquid toner dispersion medium is dielectric, the positive ions are held on the liquid toner layer surface, thus forming electric fields with the conductive image bearing structure 501. The electric fields thus formed apply electrostatic force to the positively charged pigment particles in the liquid toner layer; that is, electrophoresis occurs with the pigment particles so that the latter move towards the cylindrical wall of the conductive image bearing structure 501, thus forming a toner image 546 on the latter 501. The polarity of the ions controlled by the ion current controlling unit 503 may be opposite to that of the charge liquid toner layer. That is, the electric fields formed by the negative ions sticking to the liquid toner layer surface apply electrostatic force to the positively charged pigment particles in the liquid toner layer so that the pigment particles are moved towards the surface of the liquid toner layer. And the pigment particles stick to one another, thus forming a toner image on the cylindrical wall of the conductive image bearing structure 501. As the liquid toner layer passes through the surplus toner removing unit 504 (FIG. 15), the surplus of toner in the non-image region is removed from the conductive image bearing structure 501, so that a toner image 546 is formed in correspondence to the image pattern (FIG. 18(*c*)). After passing through the surplus toner removing unit, the toner image is fixed on the conductive image bearing structure 501 by the heating means 505, thus providing a block copy (FIG. 18(*d*).

The operation of copying an original image is carried as shown in FIGS. 18(*e*) through 18(*h*). The charging unit 507 is operated to apply negative ions 548 to the conductive image bearing structure 501 on which the toner image has been fixed in the above-described manner. As a result, the ions are deposited on the region where the toner has stuck, because the toner acts as an insulator, so that the ions thus deposited provide a surface potential. On the other hand, no ions are deposited on the region where no toners have been stuck, because the region is conductive (FIG. 18(*e*)). When the toner image thus fixed (hereinafter referred to as "a primary toner image", when applicable) is developed with the liquid toner 518 with the negative ions 548 deposited on it, a secondary toner image 549 is formed on the fixed toner image by electrophoresis, and the surplus of toner on the non-image region is removed by the surplus toner removing unit 504 (FIG. 18(*f*)). The secondary toner image is electrostatically transferred from the conductive image bearing structure 501 onto the recording sheet 509 (FIG. 18(*g*)), and then fixed thereon by the fixing unit 510(FIG. 18(*h*)). By repeatedly performing the above-described image recording operation described (FIGS. 18(*e*) through 18(*h*) the same image can be recorded about 1,000 times; that is, about 1,000 recording sheets having the same image can be provided.

When, thereafter, it is required to form another image, the primary toner image is removed from the conductive image bearing structure 501 with the cleaning unit 506. If, in this case, only one image is recorded (it is unnecessary to record the same image a plurality of times), a toner image is formed on the conductive image bearing structure 501 in correspondence to an given image pattern, and then it is transferred onto a recording sheet and fixed thereon. In this operation, the heating means 505 is not used. In the apparatus, the liquid toner applying unit serves also as a developing unit.

As is apparent from the above description, in the apparatus, the conductive image bearing structure can be used repeatedly. Therefore, it is unnecessary to provide for the apparatus a mechanism for winding a belt-shaped photo-sensitive material on or rewinding it from the drum. Furthermore, images are formed by controlling a ion current, and therefore it is unnecessary to provide light shielding means for the apparatus. Thus, the invention can realize the wet recording apparatus which can repeatedly record the same image although being simple in construction. Furthermore, the apparatus is low in running cost. In addition, with the apparatus, the resultant image is bright in color and high in resolution because of employment of the liquid toner.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A wet recording apparatus in which a block copy is formed during one recording operation, and thereafter said block copy is utilized to form the same image repeatedly, said apparatus comprising:

conductive image bearing means for bearing a primary color material image and a secondary color material image thereon;

means for applying a liquid toner to said conductive image bearing means to form a liquid toner layer thereon, said liquid toner being a dispersion of charged color material particles in a dispersion medium;

ion current controlling means for causing ions to stick selectively on said liquid toner layer applied to said conductive image bearing means to form said primary color material image thereon;

heating means for fixing said primary color material image by heating;

charging means for applying ions, different from the ions of said ion current controlling means, uniformly to said fixed primary color material image on said conductive image bearing means; and, developing means for developing the ions applied by said charging means to form said secondary color material image onto said primary color material image.

2. An apparatus as claimed in claim 1, further comprising means for suspending the operation of said heating means in the case where said operation of forming the same image repeatedly is not carried out.

3. A wet recording apparatus having a developing solution applying means for forming an image on an image recording medium moving through a developing solution which has been prepared by dispersing charged color material particles in a dispersing medium, said wet recording apparatus comprising:

developing solution containment means for storing said developing solution;

means for coating said developing solution on a surface of said recording medium to provide a developing layer thereon;

recording signal generation means for generating a signal representing an image field to be recorded;

ion generating means responsive to said signal for depositing ions of a first charge onto the surface of said developing solution without any direct contact between said surface of said developing solution and said ion generating means; and, ion current controlling means coupled to said ion generating means for controlling the current such that said ions of a first charge will selectively stick to the surface of said developing solution to cause ions of a second charge to automatically form on said developing layer of said image recording medium thereby forming a color material image thereon.

4. An apparatus as claimed in claim 3, wherein said ions of a first charge have the same polarity as that of said ions of a second charge.

5. An apparatus as claimed in claim 3, wherein said ions of a first charge have a polarity that is opposite to that of said ions of a second charge.

6. An apparatus as claimed in claim 3, wherein said recording medium is a developing solution film bearing structure such that as the structure passes through the developing solution containment means a uniform developing solution film is formed on an outer cylindrical wall of said developing solution film bearing structure.

7. An apparatus as claimed in claim 6, further comprising means for transferring an image from said uniform developing solution film onto a recording sheet.

8. A wet recording apparatus having a developing solution applying means for forming an image on an image recording medium moving through a developing solution which has been prepared by dispersing charged color material particles in a dispersing medium, said wet recording apparatus comprising:

developing solution containment means for storing said developing solution;

means for coating said developing solution on a surface of said recording medium to provide a developing layer thereon;

recording signal generation means for generating a signal representing an image field to be recorded;

ion generating means responsive to said signal for depositing ions of a first charge onto the surface of said developing solution; and, ion current controlling means coupled to said ion generating means for controlling the current such that said ions of a first charge will selectively stick to the surface of said developing solution to cause ions of a second charge, equal in polarity to said ions of a first charge, to automatically form on said developing layer of said image recording medium thereby forming a color material image thereon.

9. An apparatus as claimed in claim 8, wherein the ion generating means is not in contact with the developing solution.

10. An apparatus as claimed in claims 3 or 8, wherein the maximum speed of image formation is a function of the speed which ions stick to the developing solution surface instead of the electrophoresis speed of the color material particles.

11. An apparatus as claimed in claims 3 or 8, further comprising means for fixing said color material image on said recording medium.

12. An apparatus as claimed in claim 11, wherein the recording medium is a recording sheet.

13. An apparatus as claimed in claims 3 or 8, wherein said recording medium is an image bearing means and said apparatus further comprises means for transferring said color material image from said image bearing means to a surface of a recording sheet.

14. An apparatus as claimed in claim 13, wherein the transferring means further comprises:

a transferring drum onto which said color material image is next transferred from said image bearing means; and, a pressure roller for pushing said recording sheet against said transferring drum to transfer said color material image from said transferring drum to said recording sheet.

15. An apparatus as claimed in claim 13, wherein said transferring means includes means for causing said recording sheet to come in and out of contact with said color material image formed on said image bearing means.

16. An apparatus as claimed in claims 3 or 8, wherein said recording medium is an elastic image bearing means having an elastic layer with a flat and smooth surface for forming a toner image on said surface by electrophoresis.

17. An apparatus as claimed in claim 16, further comprising transfer means having a heat source therein for transferring said toner image to a recording sheet.

18. An apparatus as claimed in claim 17, further comprising voltage applying means for applying a voltage potential across said elastic image bearing means and said transfer means which are coupled together via said recording sheet.

19. An apparatus as claimed in claims 3 or 8, further comprising a plurality of developing solution applying means for forming a pictorial color image in which a developing solution of a different color is repeatedly carried out on each successive developing solution applying means.

20. A method in a developing solution applying means for forming a block copy during one recording operation, and thereafter using said block copy to form the same image repeatedly, said method comprising the steps of:

applying a liquid toner to a conductive image bearing means to form a liquid toner layer thereon, said liquid toner having been prepared by dispersing charged color material particles in a dispersion medium;

controlling a current of ions, corresponding to image recording signals, causing ions to stick selectively on said conductive image bearing means to form a primary color material image thereon;

using a heating means to fix said primary color material image;

applying ions from a charging means, different from said controlled ions, uniformly to said fixed primary color material image on said conductive image bearing means; and, developing the ions applied by said charging means to form a secondary color material image on said primary color material image.

21. The method of claim 20, further comprising the step of suspending the operation of said heating means in the case where said operation of forming the same image repeatedly is not carried out.

22. A method in a developing solution applying means for forming an image on a recording medium which moves through a developing solution which has been prepared by dispersing charged color material particles in a dispersing medium, said method comprising the steps of:

coating said developing solution on a surface of said recording medium to provide a developing layer thereon;

generating a signal using a recording signal generating means which represents an electrical equivalent of an image field to be recorded;

generating and depositing ions of a first charge using an ion generating means onto the surface of said developing solution in response to said signal such that the ion generating means and the developing solution are not in direct contact; and, controlling the current such that said ions of said first charge will selectively stick to the surface of said developing solution to cause ions of a second charge to automatically form on said developing layer of said image recording medium thereby forming a color material image.

23. The method of claim 22, wherein said ions of a second charge have the same polarity as that of said deposited ions of a first charge.

24. The method of claim 22, wherein said ions of a second charge have a polarity that is opposite to that to that of said deposited ions of a first charge.

25. The method of claim 22, wherein said recording medium is a developing solution film bearing structure having an outer cylindrical wall and said coated developing layer is a uniform developing solution film formed on said outer cylindrical wall.

26. The method of claim 25, further comprising the step of transferring said uniform developing solution film onto a recording sheet.

27. A method in a developing solution applying means for forming an image on a recording medium which moves through a developing solution which has been prepared by dispersing charged color material particles in a dispersing medium, said method comprising the steps of:

coating said developing solution on a surface of said recording medium to provide a developing layer thereon;

generating a signal using a recording signal generating means which represents an electrical equivalent of an image field to be recorded;

generating and depositing ions of a first charge using an ion generating means onto the surface of said developing solution in response to said signal; and, controlling the current such that said ions of said first charge will selectively stick to the surface of said developing solution whereby ions of a second charge, equal in polarity to said ions of a first charge, will automatically form on said developing layer of said image recording medium thereby forming a color material image.

28. The method of claim 27, wherein the step of generating and depositing ions is such that said ion generating means and said developing solution are not in direct contact.

29. The method of claims 22 or 27, wherein the image forming maximum speed of image formation is a function of the speed which ions stick to the developing solution surface instead of the electrophoresis speed of the color material particles.

30. The method of claims 22 or 27, further comprising the step of fixing said color material image on said recording medium.

31. The method of claim 30, wherein the recording medium is a recording sheet.

32. The method of claims 22 or 27, wherein said recording medium is an image bearing means and said method further comprises the step of transferring said color material image from said image bearing means to a surface of a recording sheet.

33. The method of claim 32, wherein said transferring step further comprises the steps of:

transferring said color material image from said image bearing means onto a transferring drum; and, using a pressure roller for pushing said recording sheet against said transferring drum to transfer said color material image from said transferring drum to said recording sheet.

34. The method of claim 32, wherein said transferring means further comprises the step of causing said recording sheet to come in and out of contact with said color material image formed on said image bearing means.

35. The method of claims 22 or 27, wherein said recording medium is an elastic image bearing means having an elastic layer with a flat and smooth surface for forming a toner image on said surface by electrophoresis.

36. The method of claim 35, further comprises the step of transferring said toner image to a recording sheet by using a transfer means having a heat source.

37. The method of claim 36, further comprising the step of applying a voltage potential across said elastic image bearing means and said transfer means coupled via said recording sheet.

38. The method of claims 22 or 27, further comprising the step of forming a pictorial color image using a plurality of developing solution applying means in which a developing solution of a different color is repeatedly carried out on each successive developing solution applying means.

* * * * *